United States Patent [19]
Seymour

[11] 3,977,118
[45] Aug. 31, 1976

[54] FISHING ROD HOLDER WITH DOWN RIGGER ATTACHMENTS

[76] Inventor: Laurence E. Seymour, 1239 Aline Drive, Grosse Pointe Woods, Mich. 48236

[22] Filed: Aug. 8, 1974

[21] Appl. No.: 495,662

[52] U.S. Cl. .............................. 43/21.2; 242/84.5 R
[51] Int. Cl.² ........................................ A01K 87/04
[58] Field of Search .................... 43/4, 20, 15, 21.2, 43/27.4; 242/211, 212, 218, 219, 220, 84.2 J, 84.1 K, 84.5 B, 106, 84.5 R, 84.1 L, 84.1 A, 99

[56] References Cited
UNITED STATES PATENTS

| | | | |
|---|---|---|---|
| 1,116,721 | 11/1914 | Meder..................................... | 43/24 |
| 1,142,796 | 6/1915 | Brugman................................. | 43/24 |
| 2,580,130 | 12/1951 | Rowdon................................ | 242/106 |
| 2,664,661 | 1/1954 | Kohn ...................................... | 43/20 |
| 2,786,296 | 3/1957 | Loebensteen......................... | 43/21.2 |
| 2,786,296 | 3/1957 | Loebensteen......................... | 43/43.12 |
| 3,063,668 | 11/1962 | Yohe ...................................... | 43/21.2 |
| 3,628,274 | 12/1971 | Wojahn................................. | 43/43.12 |
| 3,835,571 | 9/1974 | Berry ........................................ | 43/21 |

*Primary Examiner*—Louis G. Mancene
*Assistant Examiner*—Peter K. Skiff
*Attorney, Agent, or Firm*—Cullen, Settle, Sloman & Cantor

[57] ABSTRACT

A compact assembly of cast parts, in the main of cast aluminum, includes a base structure adapted to be rigidly attached in any desired relation on the stern or beam side of a trolling craft, said structure being multi-functional in that it integrally incorporates (a) an upright tubular support receiving the grip or butt end of the fisherman's rod for instantaneous removal and play when a strike occurs, and (b) an adjustable rigid mount for the usual outboard line pulley supporting rod of a more or less conventional down rigger unit. A hand-operated line spool of said unit is rotatably journaled on a side of the base casting; and further pursuant to the invention said casting has pivoted, on the same side thereof, a manually operated detenting latch member. This member is releasably engageable with any one of several studs or pins projecting laterally from an adjacent side of the down rigger unit's spool, thus to releasably lock the latter against further line pay-out rotation when the sinker weight or cannon ball of the unit has been lowered to the desired deep water trolling depth.

11 Claims, 5 Drawing Figures

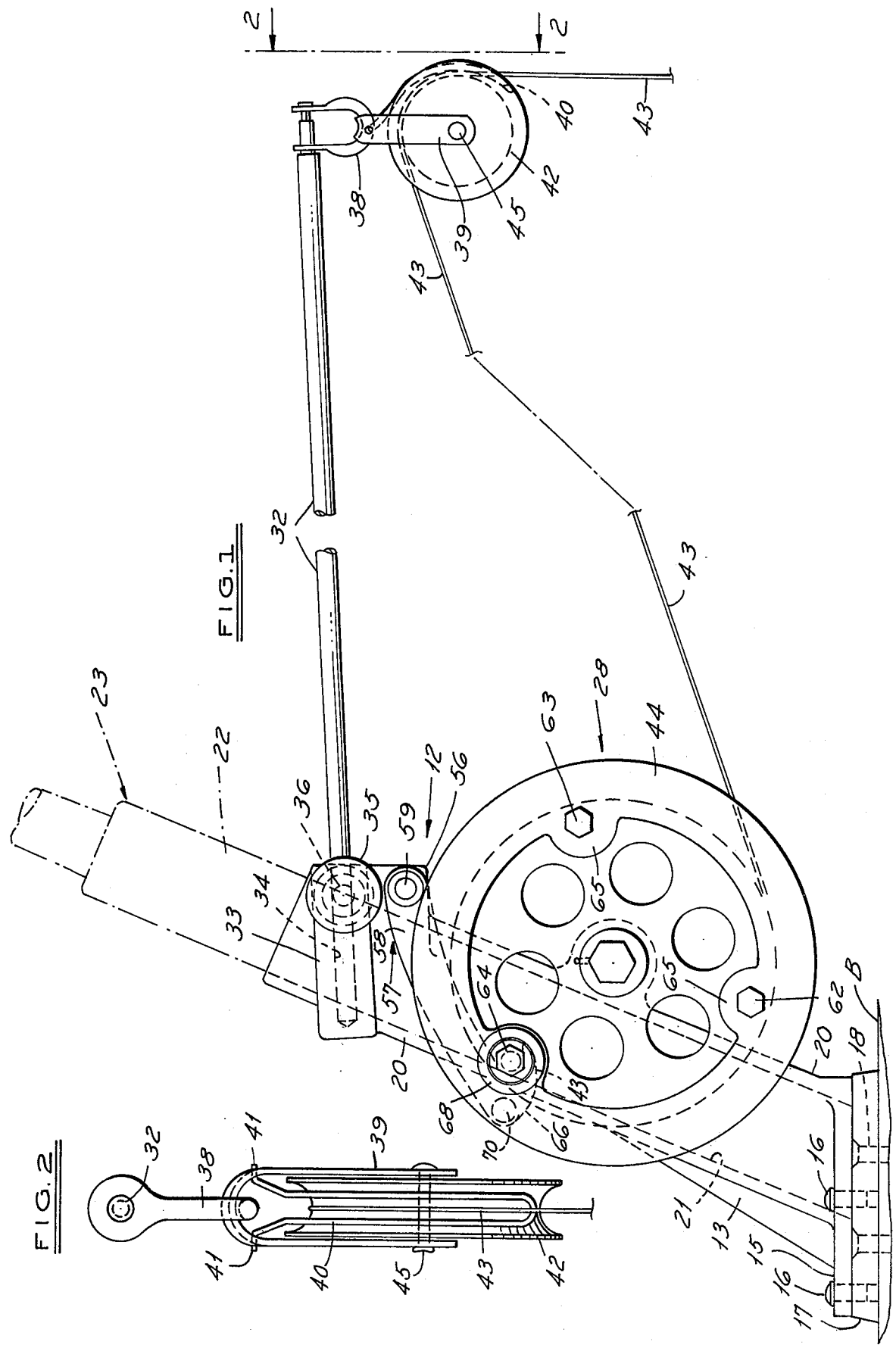

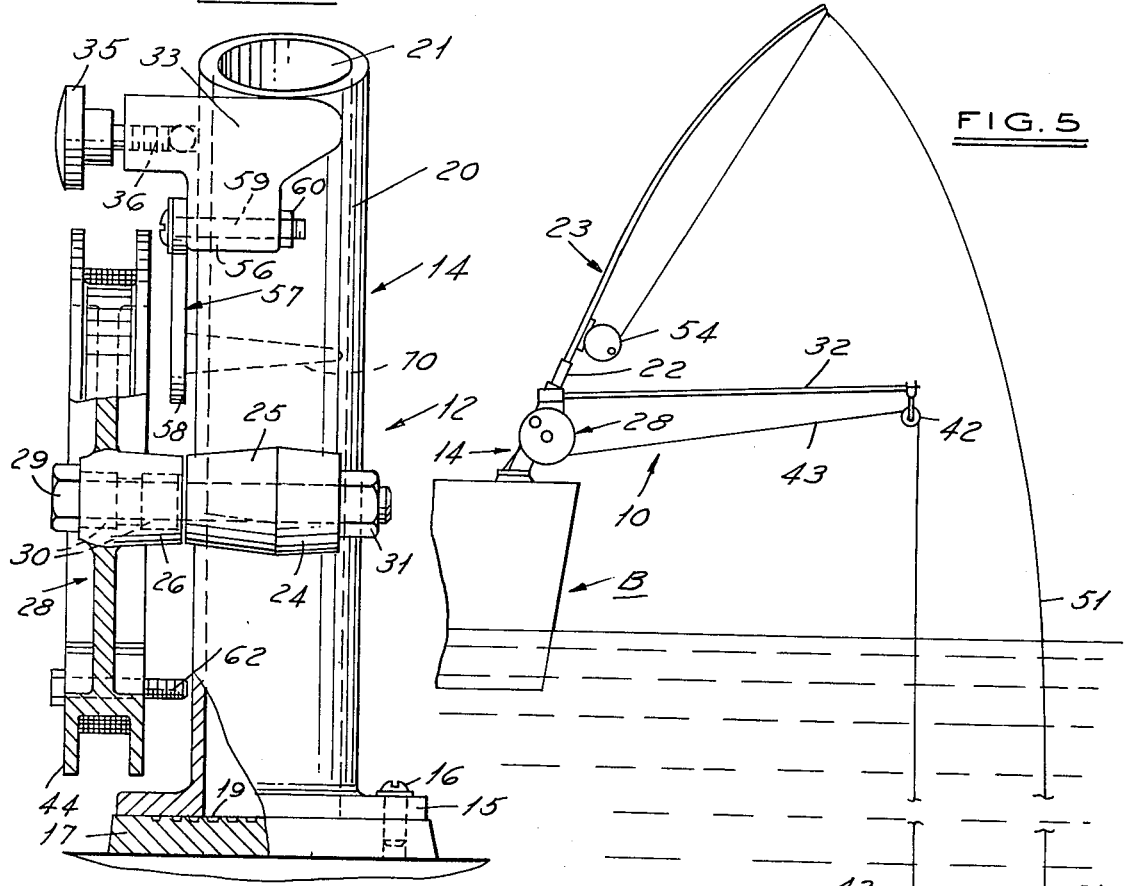
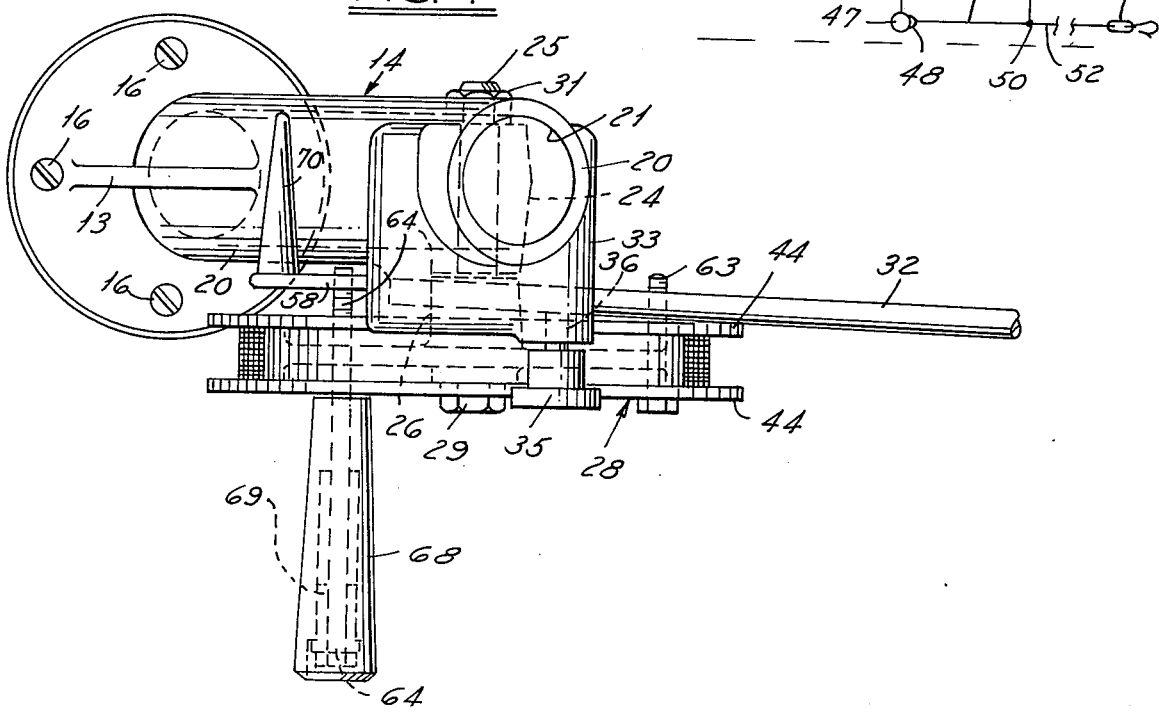

FISHING ROD HOLDER WITH DOWN RIGGER ATTACHMENTS

BACKGROUND OF THE INVENTION

1. Field of the Invention

The field of use of the improvement is self-evident from the above, i.e., in deep salt or fresh water trolling from any type of craft operating at any desired speed.

2. Description of the Prior Art

A search has revealed the following prior art patents:

| | | |
|---|---|---|
| 3,778,918 | Emory et al | December 18, 1973 |
| 3,745,688 | Brownlee | July 17, 1973 |
| 3,738,047 | Tozer | June 12, 1973 |
| 3,719,331 | Harsch | March 6, 1973 |
| 3,628,274 | Wojahn | December 21, 1971 |
| 3,614,016 | Rieth | October 19, 1971 |
| 2,984,432 | Clark | May 16, 1961 |
| 2,858,637 | Stark | November 4, 1958 |
| 2,749,649 | Fitzsimmons | June 12, 1956 |
| 2,633,308 | Zientowski | March 31, 1953 |

Of the above, the patents to Fitzsimmons, Stark, Wojahn, Harsch, Tozer, Brownlee, and Emory et al. disclose trolling down rigger units only generally similar to that of the present invention; and of these only Stark shows a down rigger device even proximately associated with a mount or holder for the trolling rod. Zientowski, Clark and Rieth disclose reel latch arrangements, the Rieth control being embodied in a deep water trolling rig, but here again the device is in no way associated physically with a fishing rod holder.

SUMMARY OF THE INVENTION

The hub of a large diameter, preferably cast aluminum, down rigger line holding spool or reel is journaled on a first ear or boss projection integral with a basic tubular rod support, also by preference of cast aluminum, which support is sized in internal diameter to receive with convenient clearance the grip of a standard deep water trolling rod.

Thus, that rod is conveniently at hand for instantaneous removal from said support or holder when a strike is made and play of the fish should begin. In all other respects save in this matter of convenient accessibility of the down rigger reel and fishing rod (plus attendant structural compactness and light weight), and in the nature of the reel latch means to be described, the herein-shown and described down rigger unit is quite conventional, i.e., as regards its line spool, line, swivels, break-away, pulley, pulley holder, rods, etc.

As for said spool or reel latch means, it is in the form of a relatively elongated latch arm pivoted at one end on a second ear or boss projection also cast integral with the tubular rod support, so that the major component of the present improvement, as such, may be mass foundry-produced, or otherwise molded of any appropriate metallic or non-metallic material, at very low cost. The same is true of the line spool of the down rigger unit.

The end of the latch arm opposite its pivoted end is formed as a downwardly projecting hook, which is adapted to be latchingly engaged with any one of three detent pins or studs which are fixedly carried by the down rigger line spool, projecting laterally therefrom in equally spaced circumferential relation to one another about the line-receiving sheave formation of said spool. The latch hook is releasably placed in restraining engagement with one of said detents when a sufficient length of line has been paid out to bring the down rigger's cannon ball sinker to the desired depth. The hook end of the latch arm also carries a finger piece manipulable by the fisherman in setting the latch holding the spool for said depth. This piece projects forward of the tubular rod holder and directly adjacent the latter, where it is close at hand when the down rigger spool is to be locked and the rod is to be removed from the holder.

BRIEF DESCRIPTION OF THE DRAWINGS

FIG. 1 is a fragmentary side elevational view of the rod holder and latch-equipped down rigger spool assembly of the invention, as operatively mounted on a surface of a trolling craft, a grip portion of a fishing rod appearing in dot-dash line;

FIG. 2 is a larger scale end view, partially broken away, from the line 2—2 of FIG. 1, showing a down rigger line guide feature;

FIGS. 3 and 4 are, respectively, rear elevational and top plan views of the combined rod holder-down rigger spool unit of FIG. 1, as aft-installed on a boat in the manner of FIG. 5; and FIG. 5 is a fragmentary schematic view of that installation.

DESCRIPTION OF A PREFERRED EMBODIMENT

FIG. 5 of the drawings schematically shows the combined fishing rod holder and down rigger assembly of the invention, generally designated by the reference numeral 10, as typically mounted atop the gunwale of a trolling boat B adjacent the stern thereof, and either amidships or to one beam side of the craft. For this purpose, as best appears in FIGS. 1 and 3, the basic cast aluminum rod holder, down rigger spool and spool latch assembly, generally designated 12, has an upright tubular cast aluminum rod holder tube structure 14 thereof formed to provide a circular bottom flange 15. The tube structure is reinforced above said flange by an integral fillet 13, and is rigidly but removably secured by a plurality of steel machine bolts 16 threaded into a flat circular mounting plate 17 in the form of an aluminum casting.

This mounting component is itself secured by flathead steel screws 18 to the gunwale or equivalent horizontally surfaced boat part, the heads of said screws lying beneath the tube flange 15. Split washers assist the studs 16 in providing a tight interconnection of the flange 15 and plate 17; and the latter is formed on its top surface (FIG. 3) to provide a plurality of concentric grooves 19 through which the areas of openings for bolts 16 and screws 18 extend.

The upright tube member 20 of the plural-purpose holder casting 14 inclines aft somewhat and is appropriately sized as to axial length and diameter of its inner bore 21 to receive with reasonable radial clearance the grip or butt portion 22 of a standard deep sea trolling rod 23, i.e., with a sufficiently close fit to afford a stable upright mount of the rod in tube bore 21, yet not sufficiently snug as to impede an easy and fast withdrawal of the rod 23 when a fish strikes.

Approximately midway of its upright length, the holder tube 20 is cast, as best shown in FIG. 3, with an integral projecting rear boss 24 having a transverse bore receiving an elongated cap screw, stud or bolt 25.

The shank of this screw passes through the bore of boss 24 and also the coaxial bore of a hub boss 26 of a line-receiving and pay-out spool 28 of the down rigger unit of the rod holder and down rigger assembly 12. The head 29 of stud 25 bears against spool hub 26; and appropriate bearing means 30 journal the spool 28 at its hub 26 for free rotation on said stud or cap screw. A nut 31 on the latter holds the spool journaling parts in axial assembly.

As best shown in FIG. 1, the down rigger unit of assembly 12 includes an elongated steel outboard support rod 32, for which the rod holder tube 20 affords an adjustable mount. To this end, said tube 20 is cast adjacent the top thereof to provide an integral boss 33 on the same tube side as the medial spool journaling boss 24; and boss 33 is cast to provide a cylindrical front-to-rear bore 34 which telescopingly receives the end of the outboard support rod 32. A Bakelite manually operable knob 35 carries a clamp screw 36 which, threading laterally into boss 33, bears against the side of rod 32 to hold the latter rigidly in an adjusted position.

Typically, in addition to the spool 28, the down rigger sub-assembly includes a depending swivel shackle 38 at the outer end of support rod 32; and said shackle sustains an inverted U-shaped depending saddle piece 39. As appears in greater detail in FIG. 2, a U-shaped and arcuately contoured line guide 40 of relatively rigid stainless steel wire is received between the depending arms of saddle piece 39, having laterally outward offset ends 41 at its top which to into recesses adjacent the top of the saddle part 39. Guide 40 arcs downwardly between the flanges of a small diameter nylon pulley 42 to laterally restrain the play of a down rigger wire line 43 (FIG. 1), which line will typically be of a total length of, say 500 feet for fresh or salt water trolling. It extends from a storage coil wound between the sheave flanges 44 of spool 28 and centrally anchored at the latter's axis, passing upwardly and rearwardly over pulley 42 of the down rigger unit. Said pulley journals on a rivet-like trunnion pin 45 connecting the arms of saddle part 39.

Otherwise, the down rigger unit is entirely conventional. As herein shown, it consists of the usual heavy cannon ball sinker 47 at the end of line 43, to which a conventional break-away device 48 and its break-away line 49 are attached for automatic release when a strike is made and play of the fish is to commence. A three-way swivel 50 connects the fishing rod line 51 to the break-away line 49, a leader 52 carrying the bait or lure 53 being connected to said swivel. Line 51 connects conventionally to a star drag-equipped fishing reel 54 of rod 23.

As best shown in FIGS. 1 and 3, an integral downward extension 56 of the top boss 33 of tubular rod holder member affords a pivotal support for a spool latching and detent device 57 of the combined assembly 12. Said device comprises a rather elongated, mildly arcuate latch arm or lever 58, which arm is pivotally mounted at its rear by a transverse stud or pin 59 held in place by a nut 60 threaded on an end of said stud, the head of the latter bearing laterally against arm 58.

Radially adjacent its outer sheave formation 44, the spool 28 carries three steel stud members 62, 63 and 64. Of these, the studs 62 and 63 thread into tapped holes in radially inner bosses 65 of the spool sheave, the stud ends projecting substantially past the side of spool 28 which faces detent latch arm 58, as viewed in FIG. 3; and the three studs serve as detent pins which are selectively and releasably engaged by a forward and downward hook formation 66 of detent latch device 57, as shown in FIG. 1.

The same hook formation also similarly engages third stud 64, which is a specially elongated one, which also serves additionally than as a detent pin for latching arm 58. That is, the stud 64 is sufficiently elongated in length to serve as a journaling mount for a Bakelite spool operating handle 68, with appropriate bearing or bushing provision 69 for this purpose. The head of stud 64 engages bushing 69 to prevent axial loss of said spool operating handle.

All three of the studs 62, 63, 64 extend equidistantly from the inner side of spool 28, sufficiently to project across the vertical plane of operating swing of latch arm 58. The latter carries adjacent its hook end a finger piece 70 for convenient manipulation by the user in making an appropriate anti-reverse lock-up of the down rigger spool 28 when an adequate length of its line 43 has been paid out to reach the desired fishing depth.

A modified form of the tubular cast aluminum rod holder tube structure 14 utilizes an upright member, approximately 11 inches in length, having a tubular portion (extending 360°) in the lower portion thereof adjacent the mounting flange 15, of approximately 3 inches in height, with the remaining portion being of U-shape configuration and opened at the rear. The closed and forward portion of the U provides the longitudinal support for the trolling rod 23. In removing the rod 23 from the modified upright member, the rod 23 is lifted 3 inches to remove the rod from the lower tubular portion and thereafter is moved rearwardly through the open side of the U-shape portion of the modified upright member.

What is claimed is:

1. A unitary combination in trolling equipment of a holder formed to removably support a fishing rod, and a trolling control device fixedly connected to said holder in close proximity to the latter, said device including a line receiving and pay-out spool having means directly supporting and rotatively journaling the same on said rod holder, said holder is a tubular one sized as to internal diameter and axial length to readily and removably receive yet stably support the hand grip portion of said fishing rod, said tubular holder having a movable latch member mounted thereon at one side thereof and actuable to releasably hold said spool in a rotatively set position, said line spool being carried by the rod holder at the same side of the latter as said latch member, said holder is a unitary casting including an upright tubular portion receiving said rod grip portion, and having integral boss formations thereon to rotatably journal the line spool, as well as to fixedly clamp an outboard rod member of a deep water down rigger unit of which said spool is a part.

2. The combination of claim 1, in which said latch member is an arm pivotally mounted on said rod holder and having a detent hook portion releasably engageable with a detent element on said line spool.

3. The combination of claim 2 in which said detent element is in the form of a threaded stud carried by said line spool.

4. The combination of claim 2 in which said line spool carries a plurality of detent elements which are selectively and releasably engaged by the detent hook portion of said latch member.

5. The combination of claim 4 in which each of said detent elements is in the form of a threaded stud carried by said line spool.

6. A unitary fishing rod holder and down rigger assembly for use in deep water trolling comprising:
- a down rigger line receiving and paying out spool having at least one detent member extending from a side thereof;
- a movable latching arm for releasably engaging said detent member and locking said spool in a rotatively set position;
- an outboard down rigger support rod having means at the outboard end thereof for guidably receiving the line from said spool;
- a unitary integrally cast fishing rod holder comprising an upright tubular support member sized as to internal diameter and axial length to readily and removably receive yet stably support the hand grip portion of a fishing rod, a mounting flange integral with the base of said tubular support member for mounting said unitary assembly, a spool-supporting boss positioned between the ends of said tubular support member and having a bore transverse thereto, a support rod housing boss positioned above said spool-supporting boss and having a front to back bore substantiallly perpendicular to said transverse bore for telescopically receiving the inboard end of said support rod, and a latching arm supporting boss positioned on the same side of said tubular support member as said spool-supporting boss and having a pin-receiving transverse bore; and
- wherein said unitary assembly further includes means received within the transverse bore of said spool-supporting boss for rotatively journaling said spool to said unitary rod holder and a pin means received within said pin-receiving bore for pivotally mounting said movable latching arm on said unitary rod holder in operable relation to said detent member.

7. The unitary fishing rod holder and down rigger assembly of claim 6 further characterized in that said movable latching arm includes an arm pivotally mounted on said pin means and having a detent hook for releasably engaging said detent member.

8. The unitary fishing rod holder and down rigger assembly of claim 7 further characterized in that said detent member is a threaded stud extending from the side of said spool facing said unitary rod support.

9. The unitary fishing rod holder and down rigger assembly of claim 7 further characterized in that said detent member is a threaded member extending transversely through said spool and having a stud portion extending toward said unitary rod holder for releasably engaging said detent hook, a handle-mounting portion extending in the opposite direction and a handle mounted on said handle-mounting portion for manually operating said spool.

10. The unitary fishing rod holder and down rigger assembly of claim 9 further characterized in that said movable latching arm includes a finger piece for manually operating said latching arm.

11. In a trolling combination of a fishing rod support and a down rigger assembly having a line spool for playing out and receiving a down rigger line and a down rigger rod for supporting and guiding said line, an improved unitary fishing rod support comprising:
- an upright integrally cast tubular support member sized as to internal diameter and axial length to readily and removably receive yet stably support the hand grip portion of a fishing rod;
- a flange integral with the base of said tubular support for mounting same;
- a spool-supporting boss integral with and transverse of said tubular support;
- spool-mounting means received within said spool-mounting boss for rotatively mounting said spool to said tubular support;
- said unitary fishing rod support further including a down rigger rod-supporting boss integral with said tubular support and having a front-to-back oriented bore for telescopically receiving and supporting the inboard end of said down rigger rod and means for securing said inboard end within said front-to-back oriented bore;
- said unitary fishing rod support further including a latching arm for releasably locking said spool in a rotatively fixed position, a second boss integral with said tubular support and having a pin-receiving bore transverse of said tubular support and positioned on the same side thereof as said spool-supporting boss and a pin received within said pin-receiving bore for pivotally mounting said latching arm in operable relation to said spool;
- said spool including at least one detent member extending from the side thereof, said latching arm including a hook portion for releasably engaging said detent member, and a manually engageable handle for selectively positioning said latching arm.

* * * * *